(12) United States Patent
Cheng et al.

(10) Patent No.: US 12,315,968 B2
(45) Date of Patent: May 27, 2025

(54) PATTERNED CATALYST LAYERS IN FUEL CELLS

(71) Applicant: Robert Bosch GmbH, Stuttgart (DE)

(72) Inventors: Lei Cheng, San Jose, CA (US); Michael Metzger, Sunnyvale, CA (US); Saravanan Kuppan, Sunnyvale, CA (US); Christina Johnston, Spanish Fort, AL (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/204,023

(22) Filed: May 31, 2023

(65) Prior Publication Data

US 2023/0307667 A1    Sep. 28, 2023

Related U.S. Application Data

(63) Continuation of application No. 16/906,583, filed on Jun. 19, 2020, now Pat. No. 11,705,558.

(51) Int. Cl.
| | |
|---|---|
| *H01M 8/0263* | (2016.01) |
| *H01M 4/86* | (2006.01) |
| *H01M 4/92* | (2006.01) |
| *H01M 8/0258* | (2016.01) |

(52) U.S. Cl.
CPC ......... *H01M 8/0263* (2013.01); *H01M 4/861* (2013.01); *H01M 4/8642* (2013.01); *H01M 4/8663* (2013.01); *H01M 4/921* (2013.01); *H01M 4/926* (2013.01); *H01M 8/0258* (2013.01)

(58) Field of Classification Search
None
See application file for complete search history.

(56) References Cited

U.S. PATENT DOCUMENTS

| | | |
|---|---|---|
| 8,227,124 B2 | 7/2012 | Fuss et al. |
| 2006/0127708 A1 | 6/2006 | Ping et al. |
| 2010/0178583 A1 | 7/2010 | Han et al. |
| 2013/0029246 A1 | 1/2013 | Akiyama |
| 2017/0271687 A1 | 9/2017 | Chi et al. |

(Continued)

FOREIGN PATENT DOCUMENTS

| | | |
|---|---|---|
| CN | 101350409 B | 12/2010 |
| CN | 106099122 | * 11/2016 |

(Continued)

Primary Examiner — Jonathan Crepeau
(74) Attorney, Agent, or Firm — Brooks Kushman P.C.

(57) ABSTRACT

A fuel cell includes a flow field plate, a catalyst layer, and a gas diffusion layer (GDL). The flow field plate has at least one channel and at least one land. Each of the at least one channel being positioned between two adjacent lands. The GDL is positioned between the flow field plate and the catalyst layer. The catalyst layer has a first region aligned with the at least one channel and a second region aligned with the at least one land. The first region has a first composition, a first carbon material, and a first carbon ratio of an amount of the first composition to the first carbon material. The second region has a second composition, a second carbon material, and a second carbon ratio of an amount of the second composition to the second carbon material. The first carbon ratio is different than the second carbon ratio.

19 Claims, 4 Drawing Sheets

(56) References Cited

U.S. PATENT DOCUMENTS

| | | | |
|---|---|---|---|
| 2018/0026274 A1* | 1/2018 | Son | H01M 4/8663 |
| | | | 429/524 |
| 2019/0207225 A1 | 7/2019 | Banham et al. | |
| 2019/0336956 A1* | 11/2019 | Suzue | H01M 4/8828 |
| 2021/0135252 A1 | 5/2021 | Cheng et al. | |

FOREIGN PATENT DOCUMENTS

| | | |
|---|---|---|
| CN | 106380614 A | 2/2017 |
| CN | 107634229 A | 1/2018 |
| CN | 107665997 A | 2/2018 |

\* cited by examiner

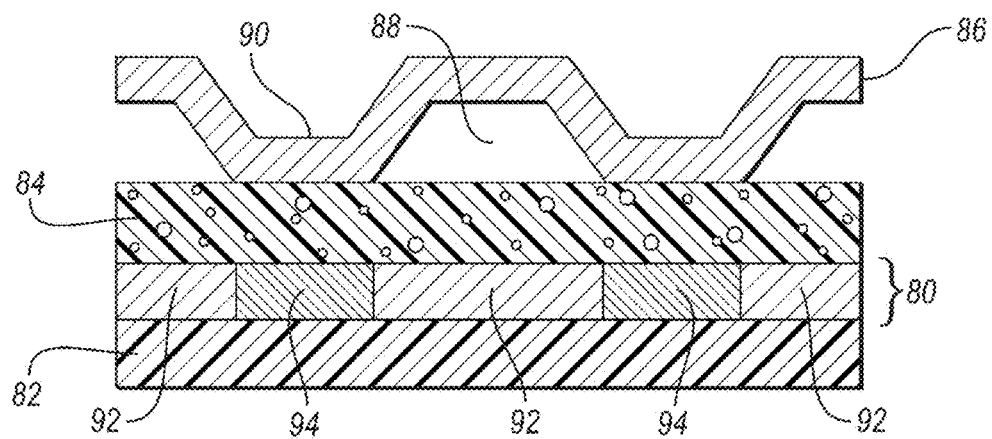
FIG. 4
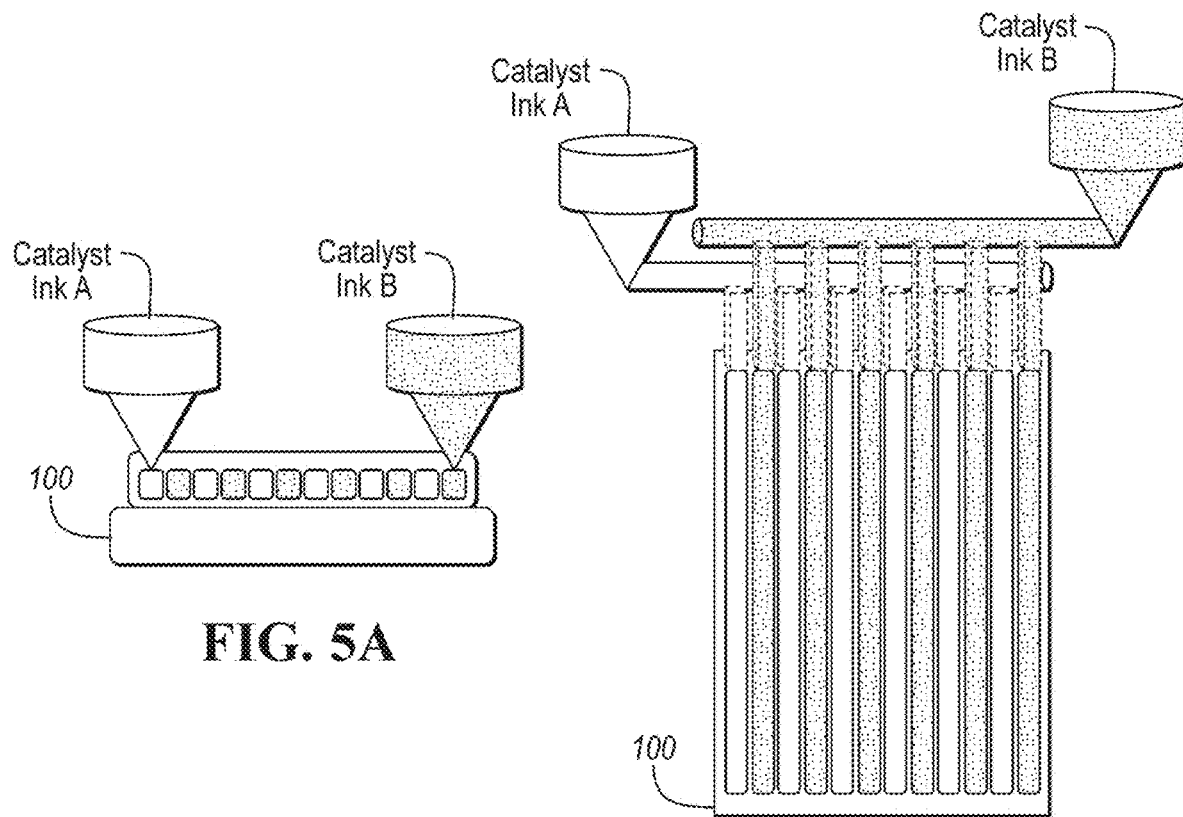
FIG. 5A
FIG. 5B

PATTERNED CATALYST LAYERS IN FUEL CELLS

CROSS-REFERENCE TO RELATED APPLICATION

This application is a continuation of U.S. application Ser. No. 16/906,583, filed Jun. 19, 2020, and issued as U.S. Pat. No. 11,705,558 on Jul. 18, 2023, the disclosure of which is incorporated herein by reference in its entirety.

TECHNICAL FIELD

The present disclosure relates to catalyst materials of catalyst layers in fuel cells, for example, patterned catalyst layers in fuel cells.

BACKGROUND

Fuel cells have shown promise as an alternative power source for vehicles and other transportation applications. Fuel cells operate with a renewable energy carrier, such as hydrogen. Fuel cells also operate without toxic emissions and greenhouse gases. One of the current limitations of widespread adoption and use of this clean and sustainable technology is the relatively expensive cost of the catalysts (e.g. platinum catalysts), which are found in the catalyst layer of both the anode and the cathode of a fuel cell. Additionally, catalyst nanoparticles are prone to grow due to changes of operational conditions in the fuel cell, which adversely impacts on the performance of the catalyst nanoparticles and the fuel cell.

SUMMARY

According to one embodiment, a fuel cell includes a flow field plate, a catalyst layer, and a gas diffusion layer (GDL) is disclosed. The flow field plate has at least one channel and at least one land. Each of the at least one channel being positioned between two adjacent lands. The GDL is positioned between the flow field plate and the catalyst layer. The catalyst layer has a first region aligned with the at least one channel and a second region aligned with the at least one land. The first region has a first composition, a first carbon material, and a first carbon ratio of an amount of the first composition to the first carbon material. The second region has a second composition, a second carbon material, and a second carbon ratio of an amount of the second composition to the second carbon material. The first carbon ratio is different than the second carbon ratio.

According to one embodiment, a fuel cell includes a flow field plate, a catalyst layer, and a gas diffusion layer (GDL) is disclosed. The flow field plate has at least one channel and at least one land. Each of the at least one channel being positioned between two adjacent lands. The GDL is positioned between the flow field plate and the catalyst layer. The catalyst layer has a first region aligned with the at least one channel and a second region aligned with the at least one land. The first region has a first catalyst composition, a first carbon material, and a first carbon ratio of an amount of the first catalyst composition to the first carbon material. The second region has a second catalyst composition, a second carbon material, and a second carbon ratio of an amount of the second catalyst composition to the second carbon material. The first carbon ratio is different than the second carbon ratio.

According to one embodiment, a fuel cell includes a flow field plate, a catalyst layer, and a gas diffusion layer (GDL) is disclosed. The flow field plate has at least one channel and at least one land. Each of the at least one channel being positioned between two adjacent lands. The GDL is positioned between the flow field plate and the catalyst layer. The catalyst layer has a first region aligned with the at least one channel and a second region aligned with the at least one land. The first region has a first ionomer composition, a first carbon material, and a first carbon ratio of an amount of the first ionomer composition to the first carbon material. The second region has a second ionomer composition, a second carbon material, and a second carbon ratio of an amount of the second ionomer composition to the second carbon material. The first carbon ratio is different than the second carbon ratio.

BRIEF DESCRIPTION OF THE DRAWINGS

FIG. 4 depicts a schematic cross-sectional view of a patterned catalyst layer in a PEM fuel cell.

FIG. 5A depicts a schematic cross-sectional view of a printing method used to prepare a patterned catalyst layer in a PEM fuel cell.

FIG. 5B depicts a schematic top view of the printing method of FIG. 5A.

DETAILED DESCRIPTION

Figure 1:
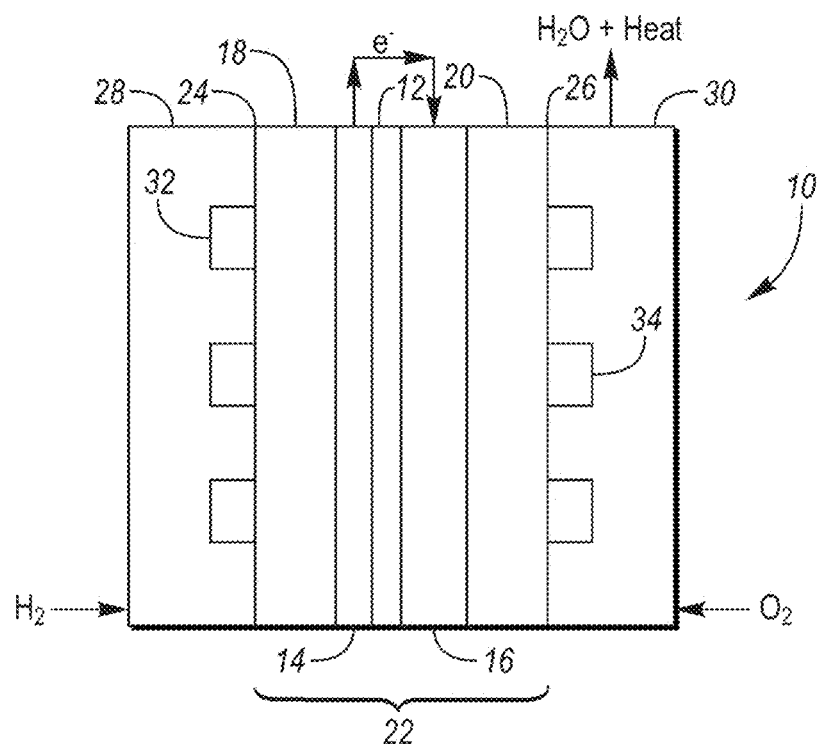
FIG. 1 depicts a schematic side view of a PEM fuel cell.

Embodiments of the present disclosure are described herein. It is to be understood, however, that the disclosed embodiments are merely examples and other embodiments can take various and alternative forms. The figures are not necessarily to scale; some features could be exaggerated or minimized to show details of components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for applications or implementations.

This present disclosure is not limited to the specific embodiments and methods described below, as specific components and/or conditions may, of course, vary. Furthermore, the terminology used herein is used only for the purpose of describing embodiments of the present disclosure and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

The description of a group or class of materials as suitable for a given purpose in connection with one or more embodiments implies that mixtures of any two or more of the members of the group or class are suitable. Description of constituents in chemical terms refers to the constituents at the time of addition to any combination specified in the description and does not necessarily preclude chemical interactions among constituents of the mixture once mixed.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

The term "substantially" may be used herein to describe disclosed or claimed embodiments. The term "substantially" may modify any value or relative characteristic disclosed or claimed in the present disclosure. "Substantially" may signify that the value or relative characteristic it modifies is within ±0%, 0.1%, 0.5%, 1%, 2%, 3%, 4%, 5% or 10% of the value or relative characteristic.

Reference is being made in detail to compositions, embodiments, and methods of embodiments known to the inventors. However, it should be understood that disclosed embodiments are merely exemplary of the present disclosure which may be embodied in various and alternative forms. Therefore, specific details disclosed herein are not to be interpreted as limiting, rather merely as representative bases for teaching one skilled in the art to variously employ the present disclosure.

Polymer electrolyte membrane (PEM) fuel cells show great potential as an alternative solution for energy production and consumption. Particularly, PEM fuel cells are being developed as electrical power sources for automobile applications. However, widespread adoption requires further research into lifetime and cost reduction for catalysts, such as platinum (Pt) catalysts, used in the PEM fuel cells.

A typical single PEM fuel cell is composed of a PEM, an anode layer, a cathode layer, and gas diffusion layers. These components form a membrane electrode assembly (MEA), which is surrounded by two flow field plates. Out of all the MEA components, the catalyst, which is found in both the anode and cathode layers, is commonly the most expensive constituent due to the necessity of using Pt at both the anode and cathode layers. At the anode layer, Pt catalyst catalyzes a hydrogen oxidation reaction (HOR, $H_2 \rightarrow 2H^+ + 2e^-$), where $H_2$ is oxidized to generate electrons and protons ($H^+$); and at the cathode layer, Pt catalyst catalyzes an oxygen reduction reaction (ORR, $\frac{1}{2}O_2 + 2H^+ + 2e^- \rightarrow H_2O$), where $O_2$ reacts with $H^+$ and is reduced to form water.

During a normal operation of a PEM fuel cell, the sizes of Pt catalyst nanoparticles may grow due to dynamic changes of operational conditions in the PEM fuel cell. The growth of the Pt catalyst nanoparticles may lead to a loss of an electrochemical surface area (ECSA), which adversely affects the HOR and/or the ORR and consequently causes degradation toward the performance of the PEM fuel cell. Specifically, operational parameters, such as operation potential, moisture content, temperature, or pressure, are common factors that influence the growth of the Pt catalyst nanoparticles.

For example, during a start-up stage of a PEM fuel cell, especially after a long shut-down period, a high cathodic overpotential may cause protons ($H^+$) to be drawn from the anode layer to the cathode layer for the ORR to occur. This may require a carbon material of the carbon support in the anode layer to react with water to generate the protons. Similar phenomena may also occur when insufficient fuels are supplied to the PEM fuel cell (i.e. during fuel starvation). Reactions (1) and (2) are included hereby to illustrate the oxidation of carbon in the presence of water for the generation of protons, where SHE represents standard hydrogen electrode:

$$C + 2H_2O \rightarrow CO_2 + 4e^- + 4H^+, \sim 1.2 \text{ V vs. SHE} \quad (1)$$

$$C + H_2O \rightarrow CO + 2e^- + 2H^+, \sim 1.2 \text{ V vs. SHE} \quad (2)$$

Consequently, after several start-up and/or shut-down processes, the PEM fuel cell may suffer carbon corrosion, which may lead to Pt catalyst dissolution and a loss of the ECSA. A resulting porous carbon support may ultimately break down or collapse.

On the other hand, when the PEM fuel cell balances dynamic loads under different operational conditions, cell voltages of the PEM fuel cell may change from low potentials (e.g. about 0.6 V vs. SHE) to high potentials (e.g. about 0.9 V vs. SHE) or even to an open circuit voltage (e.g. about 1.0-1.2 V vs. SHE). Repeated oxidation and reduction due to voltage cycling may also lead to Pt catalyst dissolution and even redeposition as PtO, which may induce the coarsening of Pt catalyst nanoparticles (i.e. Ostwald ripening) and the formation of Pt bands in the PEM fuel cell. Several relevant reactions are included below:

$$Pt \rightarrow Pt^{2+} + 2e^-, \sim 1.19 \text{ V vs. SHE} \quad (3)$$

$$Pt + H_2O \rightarrow PtO + 2H^+ + 2e^-, \sim 0.98 \text{ V vs. SHE} \quad (4)$$

$$PtO + H_2O \rightarrow PtO_2 + 2H^+ + 2e^-, \sim 1.05 \text{ V vs. SHE} \quad (5)$$

$$PtO_2 + H_2O \rightarrow PtO_3 + 2H^+ + 2e^-, \sim 2.00 \text{ V vs. SHE} \quad (6)$$

$$PtO + 2H^+ \rightarrow Pt^{2+} + H_2O \quad (7)$$

$$PtO_2 + 4H^+ + 2e^- \rightarrow Pt^{2+} + 2H_2O, \sim 0.83 \text{ V vs. SHE} \quad (8)$$

Apart from the operational conditions in the PEM fuel cell, uneven catalyst distribution across the ECSA may also affect the performance of the PEM fuel cell. For example, for a 25 cm² PEM fuel cell, Pt catalyst nanoparticles exhibit different degrees of particle growth and degradation across the ECSA in the PEM fuel cell.

Therefore, there is a need to minimize the degradation of the Pt catalyst nanoparticles, including the growth, the dissolution, and the loss of the ECSA of the Pt catalyst nanoparticles, while maintaining the performance of the PEM fuel cell. Aspects of the present disclosure are directed to a catalyst layer of a PEM fuel cell that has patterned catalyst materials based on a flow field geometry of the PEM fuel cell. In a first embodiment, catalyst compositions in different regions of a catalyst layer are different based on a flow field geometry of a PEM fuel cell. In a second embodiment, Pt/C ratios in different regions of a catalyst layer are different based on a flow field geometry of a PEM fuel cell. In a third embodiment, ionomer/C ratios in different regions of a catalyst layer are different based on a flow field geometry of a PEM fuel cell. In a fourth embodiment, catalyst particle sizes in different regions of a catalyst layer are different based on a flow field geometry of a PEM fuel cell. In a fifth embodiment, the hydrophobicity of carbon supports in different regions of a catalyst layer are different based on a flow field geometry of a PEM fuel cell. In a sixth embodiment, the porosities in different regions of a catalyst layer are different based on a flow field geometry of a PEM fuel cell.

FIG. 1 depicts a schematic side view of a PEM fuel cell 10. The PEM fuel cell 10 can be stacked to create a fuel cell stack assembly. The PEM fuel cell 10 includes a polymer electrolyte membrane (PEM) 12, an anode layer 14, a cathode layer 16, an anode gas diffusion layer (GDL) 18, and a cathode GDL 20. The PEM 12 is situated between the anode layer 14 and the cathode layer 16. The anode layer 14 is situated between the anode GDL 18 and the PEM 12, and the cathode layer 16 is situated between the cathode GDL 20 and the PEM 12. Further, the PEM 12, the anode 14, the cathode 16, and the anode and cathode GDLs 18 and 20 comprise a membrane electrode assembly (MEA) 22. A catalyst material, such as platinum (Pt), is included in the anode layer 14 and the cathode layer 16. The catalyst material is supported on a catalyst support.

In addition, a first side 24 of the MEA 22 is bound by an anode flow field plate 28, and the second side 26 of the MEA 22 is bounded by a cathode flow field plate 30. The anode flow field plate 28 includes an anode flow field 32 configured to distribute $H_2$ to the MEA 22. The cathode flow field plate 30 includes a cathode flow field 34 configured to distribute $O_2$ to the MEA 22.

Figure 2:
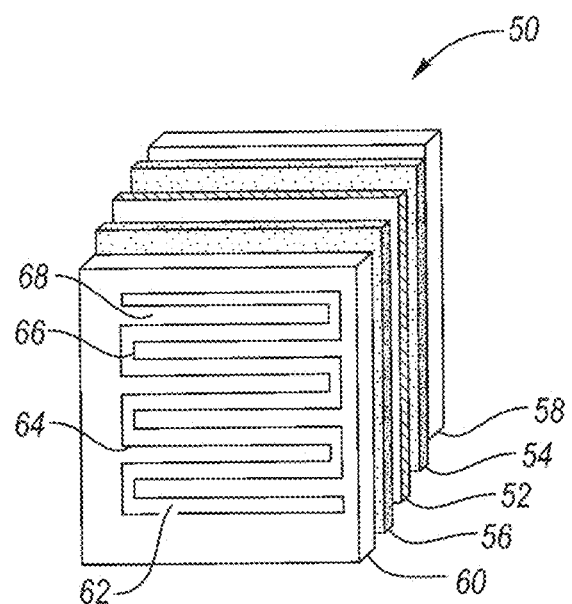
FIG. 2 depicts a schematic perspective view of a PEM fuel cell.

FIG. 2 depicts a schematic perspective view of a PEM fuel cell 50. As shown in FIG. 2, the PEM fuel cell 50 includes an anode layer 54 and a cathode layer 56, and a PEM 52 is situated between the anode layer 54 and the cathode layer 56. The PEM fuel cell 50 also includes an anode GDL 58 and a cathode GDL 60. Further, the PEM fuel cell 50 includes an anode flow field plate (not shown) bound by the anode GDL 58, and a cathode flow field plate 62 bound by the second GDL 60. In addition, each of the anode and the cathode flow field plate includes a flow field having at least one channel and at least one land for supplying reactants (i.e. $H_2$ or $O_2$) to the PEM fuel cell 50.

For example, the cathode flow field plate 62, positioning on the cathode side of the PEM fuel cell 50, includes a cathode flow field 64. The cathode flow field 64 includes at least one channel 66 and at least one land 68. Each of the at least one channel 66 is positioned between two adjacent lands 68 (i.e. each of the at least one channel 66 and each of the at least one land 68 are arranged alternately in the width of the cathode flow field 64). As shown in FIG. 2, the flow field geometry of the cathode flow field 64 is serpentine. However, the present disclosure is not limited to this flow field geometry. Other flow field geometries may be incorporated into the PEM fuel cell, including, but not limited to, a parallel or spiral flow field geometry.

In addition, the at least one channel 66 may have any suitable width, cross-sectional area, depth, shape, and/or configuration to distribute a reactant (i.e. $O_2$) along the length thereof. Similarly, the at least one land 68 may also have any suitable width, cross-sectional area, height, shape, and/or configuration. In one embodiment, the at least one channel 66 may be evenly distributed across the width of the cathode flow field plate 62, and accordingly, the at least one land 68 may also have uniform widths. In another embodiment, the at least one channel 66 may be non-uniformly distributed across the width of the cathode flow field plate 62 such that the at least one land 68 may also have non-uniform widths.

Figure 3:
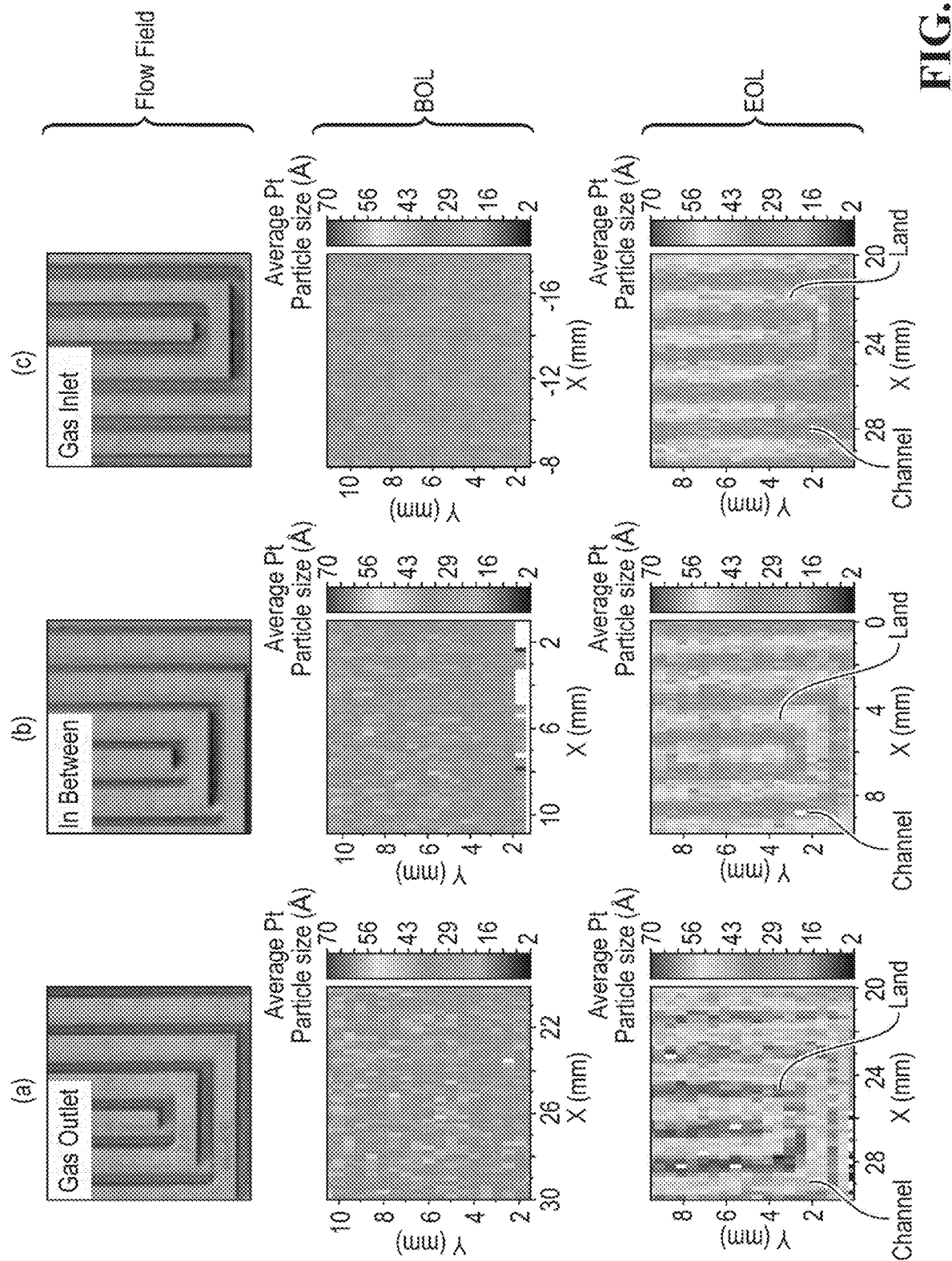
FIG. 3 depicts images illustrating degrees of degradation of Pt catalyst nanoparticles at three different regions of a flow field plate in a PEM fuel cell.

FIG. 3 depicts images illustrating degrees of degradation of Pt catalyst nanoparticles at three different regions of a flow field plate in a PEM fuel cell. FIG. 3 shows the degradation of the Pt catalyst nanoparticles at a beginning of life (BOL) stage and an end of life (EOL) stage of the PEM fuel cell. The three different regions, from left to right, are (a) near a gas outlet, (b) a region between the gas outlet and a gas inlet, and (c) the gas inlet, respectively. In addition, the degrees of degradation of the Pt catalyst degradation at each location at either of the BOL or the EOL stage are indicated by the sizes of the Pt catalyst nanoparticles.

Referring to FIG. 3, the sizes of the Pt catalyst nanoparticle at the EOL stage are generally larger than those at the BOL stage. Based on the sizes of the Pt catalyst nanoparticles, the ECSA of the Pt catalyst nanoparticles at the EOL stage may be 70% smaller than that at the BOL stage, and accordingly, the performance of the PEM fuel cell may drop about 20% since the EOL stage. In addition, at the EOL stage, the sizes of the Pt catalyst nanoparticles near the gas outlet are larger than those near the gas inlet and those in the region between the gas outlet and gas inlet. This suggests that Pt catalyst nanoparticles are more susceptible to degradation near the gas outlet. Specifically, at the EOL stage, Pt catalyst nanoparticles at the land areas of the flow field plate degrade more than those at the channel areas. Therefore, to improve the performance of the PEM fuel cell, different catalyst materials may be applied to a catalyst layer based on a flow field geometry of the flow field plate in the PEM fuel cell.

FIG. 4 depicts a schematic cross-sectional view of a patterned catalyst layer in a PEM fuel cell. As shown in FIG. 4, the catalyst layer 80 is situated between a PEM 82 and a gas diffusion layer 84, and the gas diffusion layer 84 is bounded by a flow field plate 86 (e.g. a bipolar plate). The flow field plate 86 has a flow field geometry, which includes at least one channel 88 and at least one land 90. As discussed in FIG. 2, each of the at least one channel 88 is positioned between two adjacent lands 90. In addition, the flow field geometry may be, but not limited to, a serpentine, parallel, or spiral configuration. Further, the at least one channel 88 may have any suitable width, cross-sectional area, depth, shape, and/or configuration to distribute a reactant (i.e. $H_2$ or $O_2$) along the length thereof. Similarly, the at least one land 90 may also have any suitable width, cross-sectional area, height, shape, and/or configuration.

To improve the performance of the PEM fuel cell, a patterned catalyst layer may be formed on a PEM. Referring to FIG. 4, the catalyst layer 80 comprises a first region 92 and a second region 94. The first region 92 is aligned with the at least one channel 88 of the flow field plate 86, and the second region 94 is aligned with the at least one land 90 of the flow field plate 86. According to the flow field geometry of the flow field plate 86, the first and second regions, 92 and 94, of the catalyst layer 80 are therefore formed alternately on the PEM 82. Additionally, the width of each of the first region 92 substantially corresponds to that of one of the at least one channel 88 of the flow field plate 86, and the width of each of the second region 94 substantially corresponds to that of one of the at least one land 90 of the flow field plate 86.

For example, for a cathode flow field plate, the width of a land area may be in a range of 300 and 500 μm, and the width of a channel area may be in a range of 600 and 1000 μm. For an anode flow field plate, the width of a land area may be in a range of 600 and 1000 μm, and the width of a channel area may be in a range of 400 and 600 μm.

As described in FIG. 4, catalysts under the land areas of a flow field plate are more susceptible to degradation than those under the channel areas thereof. Therefore, in the present disclosure, the first region 92 of the catalyst layer 80 may include a first catalyst material, and the second region 94 of the catalyst layer 80 may include a second catalyst material, where the first and the second catalyst material are different. Particularly, since the degree of degradation in the first region 92 is relatively less than that in the second region 94, the first catalyst material may be chosen to be more catalytically active than the second catalyst material, and the second catalyst material may be chosen to be more resistant to degradation than the first catalyst material. The embodiments described hereafter are directed to either the cathode side or the anode side of a PEM fuel cell.

In a first embodiment, the first region 92 of the catalyst layer 80 may include a first catalyst composition, and the second region 94 of the catalyst layer 80 may include a second catalyst composition, where the first and the second catalyst composition are different. Specifically, the first catalyst composition in the first region 92 may be Pt catalyst nanoparticles, and the second catalyst composition in the second region 94 may be Pt-M alloys or mixtures, where M is another metallic nanoparticle different from Pt, such as gold (Au), silver (Ag), titanium (Ti), or iron (Fe). The Pt-M mixtures refer to mixtures of Pt and M catalyst nanoparticles. The metallic nanoparticle M may act as nucleation seeds for Pt redeposition, which may prevent the growth of the Pt catalyst nanoparticles and minimize the loss of the ECSA.

For a single PEM fuel cell, Pt catalyst nanoparticles are dispersed on carbon supports. Variation of Pt/carbon (C) ratios may accordingly affect the performance of the PEM fuel cell. Generally, a catalyst layer may be more catalytically active with a higher Pt/C ratio. Therefore, in a second embodiment, the first catalyst composition in the first region 92 may be supported by a first catalyst support with a first carbon material, and the first region may have a first Pt/C ratio. Additionally, the second catalyst composition in the second region 94 may be supported by a second catalyst support with a second carbon material, and the second region 94 may have a second Pt/C ratio different from the first Pt/C ratio. The first and the second catalyst support form a continuous carbon support in the catalyst layer 80.

Because channel areas of the flow field plate are less prone to degradation than land areas, the first region 92 may thus include a higher level of Pt catalyst nanoparticles, i.e. a higher Pt/C ratio, than the second region 94, to maintain the performance of the PEM fuel cell. This embodiment of the patterned catalyst layer 80 may not only reduce the amount of Pt catalyst nanoparticles used in fabricating the PEM fuel cell (i.e. save costs), but also minimize the degradation to the land areas of the flow field plate 86.

Ionomers are used in an MEA of a PEM fuel cell as an electrolyte for proton conduction, and to maintain a catalyst layer as a binder. Common ionomers adopted in fabricating an MEA of a PEM fuel cell can include, but not limited to, perfluorosulfonic acid polymers, polystyrene sulfonate, or Nafion. An ionomer/C ratio of a PEM fuel cell may be in a range of 0.1 and 2. In operation, a low concentration of ionomer in the PEM fuel cell may cause a decrease in the proton conduction and may subsequently lead to a decrease in the performance of the PEM fuel cell. On the other hand, an excess concentration of ionomer may block a space volume, which may not only prevent reactants (i.e. $H_2$ and $O_2$) from entering the PEM fuel cell but also prevent the product (i.e. water) from leaving the PEM fuel cell. Consequently, this may also lead to a decrease in the performance of the PEM fuel cell. Therefore, modifying the ionomer/C ratio in a PEM fuel cell may also affect the performance and durability of the PEM fuel cell.

Therefore, in a third embodiment, the first region 92 of the catalyst layer 80 may include a first ionomer/C ratio, and the second region 94 of the catalyst layer 80 may include a second ionomer/C ratio, where the first and the second ionomer/C ratio are different. Similarly, because land areas are more susceptible to degradation, the second ionomer/C ratio in the second region 94 may thus be higher than that (i.e. the first ionomer/C ratio) in the first region 92 to help proton conduction. This may thus prevent the growth of the Pt catalyst nanoparticles and minimize the degradation to the land areas while maintain the performance of the PEM fuel cell.

Typically, the size of a Pt catalyst nanoparticle is in a range of 2 and 7 nm, and Pt catalyst nanoparticles having larger sizes are less susceptible to particle growth. As such, to improve the durability of the land areas of a flow field plate, Pt catalyst nanoparticles with large sizes may be applied to regions of a catalyst layer that are aligned with the land areas of the flow field plate. Accordingly, in a fourth embodiment, the first region 92 of the catalyst layer 80 may include a first catalyst (e.g. Pt catalyst nanoparticles) with a first particle size, and the second region 94 of the catalyst layer 80 may include a second catalyst (e.g. Pt catalyst nanoparticles) with a second particle size, where the first and the second particle size are different. To minimize the degradation to the land areas of the flow field plate, the second particle size in the second region 94 may then be larger than the first particle size in the first region 92. In one or more embodiments, the second particle size may be 3 to 5 times larger than the first particle size.

Apart from the variations regarding catalyst compositions, Pt/C ratios, ionomer/C ratios, and catalyst particle sizes, modifying the hydrophobicity of carbon supports in the catalyst layer may also affect the performance of the PEM fuel cell. In general, a carbon support with a high hydrophobicity may prevent local water formation, thereby preventing the growth of Pt catalyst nanoparticles. Examples for carbon supports may include, but not limited to, carbon black (e.g. Vulcan XC-72 or Vulcan X72R), high surface area carbon, acetylene black, or activated carbon.

In a fifth embodiment, the first region 92 of the catalyst layer 80 may include a first carbon support material with a first hydrophobicity, and the second region 94 of the catalyst layer 80 may include a second carbon support material with a second hydrophobicity, where the first and the second hydrophobicity are different. Since the land areas of the flow field plate degrade more than the channel areas, the second hydrophobicity in the second region 94 may therefore be higher than the first hydrophobicity in the first region 92.

Furthermore, the porosity of a catalyst layer can also have an impact on the performance of a PEM fuel cell. A catalyst layer with a high porosity may help water and/or gas diffusion in the PEM fuel cell, thereby reducing the growth of Pt catalyst nanoparticles. Therefore, in a sixth embodiment, the first region 92 of the catalyst layer 80 may have a first porosity, and the second region 94 of the catalyst layer 80 may have a second porosity, where the first and the second porosity are different. Because the Pt catalyst nanoparticles at the land areas of the flow field plate are more prone to particle growth, the second porosity in the second region 94 may thus be higher than the first porosity in the first region 92.

Additionally, introducing a scaffolding agent to a catalyst layer in a PEM fuel cell may further help maintain or improve the porosity of the catalyst layer. Therefore, referring to the sixth embodiment, the second region 94 of the catalyst layer 80 may further include a scaffolding agent. Examples of such a scaffolding agent may include, but not limited to, zeolites, ceramic fillers, and metal organic frameworks (MOFs).

Specifically, zeolites are microporous materials with tunable pore sizes. Examples of zeolites may include, but not limited to, molecular sieves or $Na_2O$—$Al_2O_3$—$SiO_2$—$H_2O$ systems. In addition, ceramic fillers may be, but not limited to, titanium dioxide ($TiO_2$), aluminum oxide ($Al_2O_3$), tin oxide (SnO), titanium(III) oxide ($Ti_2O_3$), magnesium titanium oxide ($MgTi_2O_{5-x}$, $0 \leq x \leq 5$), titanium nitride (TiN), or tungsten carbide (WC). Further, MOFs are a class of porous crystalline materials, which include metal ions or clusters coordinated to organic ligands. An example of an MOF that may be used as a scaffolding agent in the catalyst layer 80 may be UiO-66($SO_3H$)$_2$.

Now, methods of preparing a patterned catalyst layer in a PEM fuel cell of the present disclosure will be described. It should be understood, however, that the following preparation methods are only exemplary in nature and that any method known to one skilled in the art may be employed. Non-limiting methods include a screen-printing method, a roller printing method, and a robot-casting method.

In general, a method for preparing a patterned catalyst layer in a PEM fuel cell may be a stepwise process, which may include depositing a first catalyst ink to a membrane with a first pre-defined pattern, where the first pre-defined pattern may correspond to the channel areas of a flow field plate; and depositing a second catalyst ink, after the first catalyst ink is cured and dried, to the membrane with a second pre-defined pattern, where the second pre-defined pattern may correspond to the land areas of the flow field plate.

Alternatively, the method may be a single-step process, which may include depositing a first catalyst ink to a membrane with a first pre-defined pattern and simultaneously, depositing a second catalyst ink to the membrane with a second pre-defined pattern, where the first pre-defined pattern may correspond to the channel areas of a flow field plate, and the second pre-defined pattern may correspond to the land areas of the flow field plate. The method may be controlled and processed by a computerized system.

FIG. 5A depicts a schematic cross-sectional view of a printing method used to prepare a patterned catalyst layer in a PEM fuel cell. FIG. 5B depicts a schematic top view of the printing method of FIG. 5A. FIGS. 5A and 5B are illustrative for either the screen-printing method or the roller printing method.

Regarding the screen-printing method, a catalyst ink A may be first transferred to a membrane 100 using a first mesh screen with a pre-defined pattern. The pre-defined pattern may depend on a flow field geometry of a flow field plate. For example, the pre-defined pattern may correspond to the channel areas of the flow field plate. After the catalyst ink A is cured and dried, a catalyst ink B may then be transferred to the membrane 100 using a second mesh screen with a commensurate pattern. The commensurate pattern may then correspond to the land areas of the flow field plate. After the catalyst ink B is cured and dried, a patterned catalyst layer may then be formed.

For the roller printing method, catalyst inks A and B may be applied to two patterned rollers, respectively, by which the catalyst inks A and B may be simultaneously transferred to a membrane 100 to form a patterned catalyst layer. Alternatively, the catalyst inks A and B may be applied to the membrane 100 in a stepwise process, where one of the catalyst inks A and B is first transferred to the membrane 100, followed by transferring the other catalyst ink to the membrane 100. After the catalyst inks A and B are cured and dried, a patterned catalyst layer may be obtained.

Figure 6:
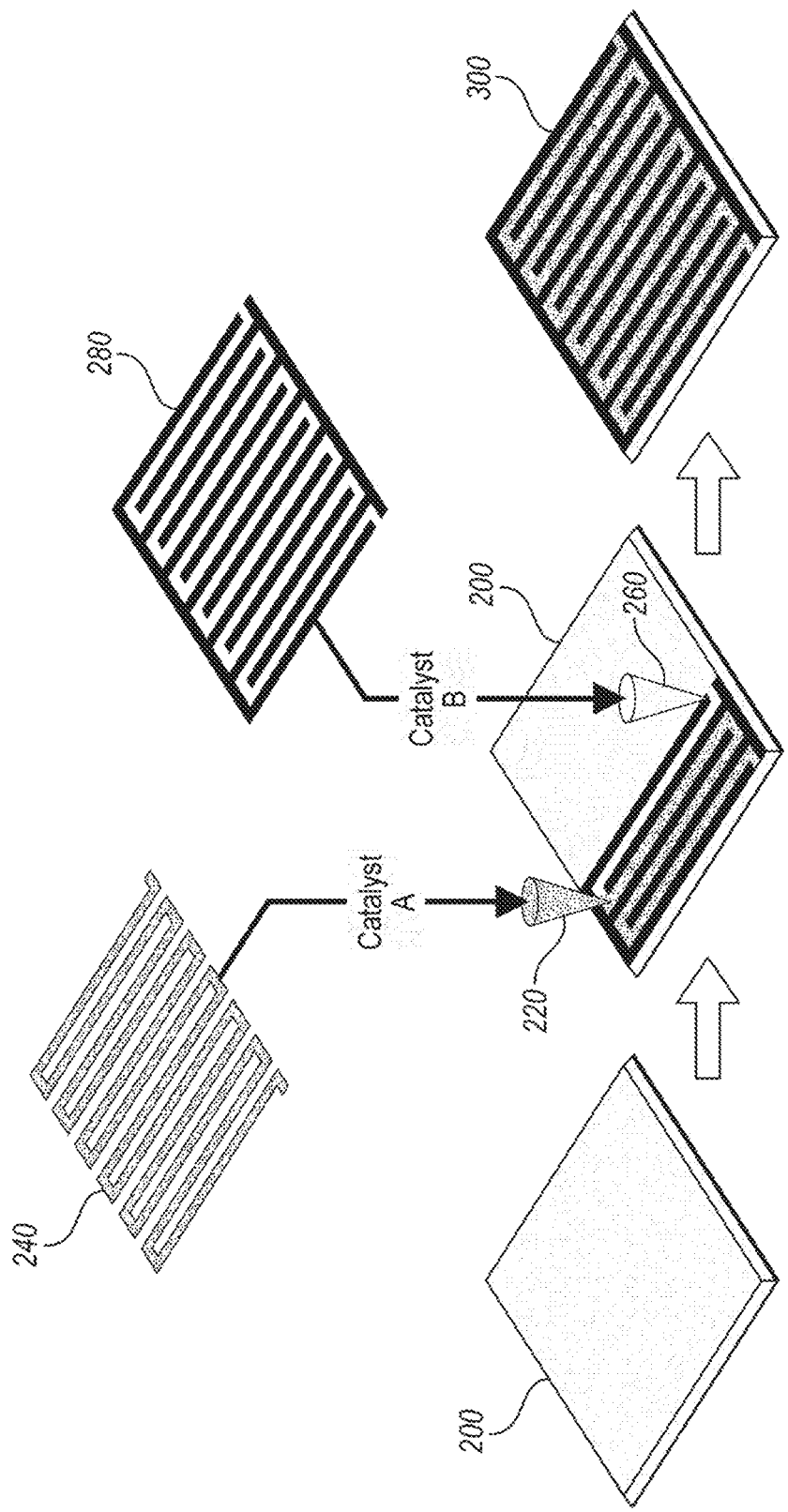
FIG. 6 depicts a robot-casting method used to prepare a patterned catalyst layer in a PEM fuel cell.

FIG. 6 depicts a robot-casting method used to prepare a patterned catalyst layer in a PEM fuel cell. As to the robot-casting method, the deposition of catalyst inks onto a membrane is controlled by computerized dispenser guns (or nozzles). Such a dispenser gun (or nozzle) may be in a size of about 50 µm and may be programmed to deposit a catalyst ink onto the membrane with a pre-defined pattern. The pre-defined pattern may depend on a flow field geometry of a flow field plate. A catalyst ink A may be applied to a membrane 200 using a first dispenser gun (or nozzle) 220 with a first pre-defined pattern 240. For example, the first pre-defined pattern 240 may correspond to the channel areas of the flow field plate. After the catalyst ink A is cured and dried, a catalyst ink B may be applied to the membrane 200 using a second dispenser gun (or nozzle) 260 with a second pattern 280. The second pattern 280 may then correspond to the land areas of the flow field plate. After the catalyst ink B is cured and dried, a patterned catalyst layer 300 is obtained. As mentioned above, although the patterned catalyst layer 300 depicted in FIG. 6 corresponds to a serpentine flow field geometry, other patterned catalyst layer (e.g. a parallel or spiral configuration) may also be prepared using the same method.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A fuel cell comprising:
   a flow field plate having at least one channel and at least one land, each of the at least one channel being positioned between two adjacent lands;
   a catalyst layer; and
   a gas diffusion layer (GDL) positioned between the flow field plate and the catalyst layer, the catalyst layer having a first region aligned with the at least one channel and a second region aligned with the at least one land, the first region having a first composition, a first carbon material, and a first carbon ratio of an amount of the first composition to the first carbon material, the second region having a second composition, a second carbon material, and a second carbon ratio of an amount of the second composition to the second carbon material, the first carbon ratio is different than the second carbon ratio, the first composition is a first catalyst composition, the second composition is a second catalyst composition different than the first catalyst composition, the first catalyst composition is more catalytically active than the second catalyst composition, and the second catalyst composition is more resistant to degradation than the first catalyst composition.

2. The fuel cell of claim 1, wherein the first catalyst composition is Pt.

3. The fuel cell of claim 2, wherein the first carbon ratio is higher than the second carbon ratio.

4. The fuel cell of claim 1, wherein the first carbon material is selected from a group consisting of carbon black, acetylene black, activated carbon, and a combination thereof, and the second carbon material is selected from a group consisting of carbon black, acetylene black, activated carbon, and a combination thereof.

5. A fuel cell comprising:
a flow field plate having at least one channel and at least one land, each of the at least one channel being positioned between two adjacent lands;
a catalyst layer; and
a gas diffusion layer (GDL) positioned between the flow field plate and the catalyst layer, the catalyst layer having a first region aligned with the at least one channel and a second region aligned with the at least one land, the first region having a first catalyst composition, a first catalyst support with a first carbon material, and a first carbon ratio of an amount of the first catalyst composition to the first carbon material, the second region having a second catalyst composition, a second catalyst support with a second carbon material, and a second carbon ratio of an amount of the second catalyst composition to the second carbon material, the first carbon material is different than the second carbon material, the first carbon ratio is different than the second carbon ratio, the second catalyst composition different than the first catalyst composition, the first catalyst composition is more catalytically active than the second catalyst composition, and the second catalyst composition is more resistant to degradation than the first catalyst composition.

6. The fuel cell of claim 5, wherein the first carbon ratio is higher than the second carbon ratio.

7. The fuel cell of claim 5, wherein the first carbon material is selected from a group consisting of carbon black, acetylene black, activated carbon, and a combination thereof, and the second carbon material is selected from a different member of the group consisting of carbon black, acetylene black, activated carbon, and a combination thereof.

8. The fuel cell of claim 5, wherein the first carbon material is carbon black.

9. The fuel cell of claim 1, wherein the first carbon material is carbon black.

10. The fuel cell of claim 1, wherein the first carbon material is acetylene black.

11. The fuel cell of claim 1, wherein the first carbon material is activated carbon.

12. The fuel cell of claim 1, wherein the second carbon material is carbon black.

13. The fuel cell of claim 1, wherein the second carbon material is acetylene black.

14. The fuel cell of claim 1, wherein the second carbon material is activated carbon.

15. The fuel cell of claim 5, wherein the first carbon material is acetylene black.

16. The fuel cell of claim 5, wherein the first carbon material is activated carbon.

17. The fuel cell of claim 16, wherein the second carbon material is carbon black.

18. The fuel cell of claim 1, wherein the second carbon material is activated carbon.

19. A fuel cell comprising:
a flow field plate having at least one channel and at least one land, each of the at least one channel being positioned between two adjacent lands;
a catalyst layer; and
a gas diffusion layer (GDL) positioned between the flow field plate and the catalyst layer, the catalyst layer having a first region aligned with the at least one channel and a second region aligned with the at least one land, the first region having a first catalyst composition, a first catalyst support with a first carbon material, and a first carbon ratio of an amount of the first catalyst composition to the first carbon material, the second region having a second catalyst composition, a second catalyst support with a second carbon material, and a second carbon ratio of an amount of the second catalyst composition to the second carbon material, the first carbon ratio is different than the second carbon ratio, the first and second catalyst supports form a continuous catalyst support, the second catalyst composition different than the first catalyst composition, the first catalyst composition is more catalytically active than the second catalyst composition, and the second catalyst composition is more resistant to degradation than the first catalyst composition.

* * * * *